United States Patent Office 3,475,830
Patented Nov. 4, 1969

3,475,830
DRYER CONTROL
Walter T. Sutton, Jr., James D. Broyles, and James B. Sims, Lexington, and Nelson F. Botts, Versailles, Ky., assignors to Texas Instruments Incorporated, Dallas, Tex., a corporation of Delaware
Filed Oct. 20, 1967, Ser. No. 679,286
Int. Cl. F26b 25/22
U.S. Cl. 34—45                                18 Claims

ABSTRACT OF THE DISCLOSURE

An electronic dryness control for home laundry dryers is disclosed. The control is of the type which employs the resistance of a current path extending through the load to be dried as an indication of the dryness or moisture content of the load. The response time of the control is lengthened by the thermal inertia of a heater to prevent a drying cycle from being terminated prematurely by transient variations in the resistance of the sensing path, the sensing resistance being employed to control the energization of the heater. When the temperature of the heater passes a preselected threshold a timer motor is energized, controlling the remained of the cycle.

---

Figure 1:
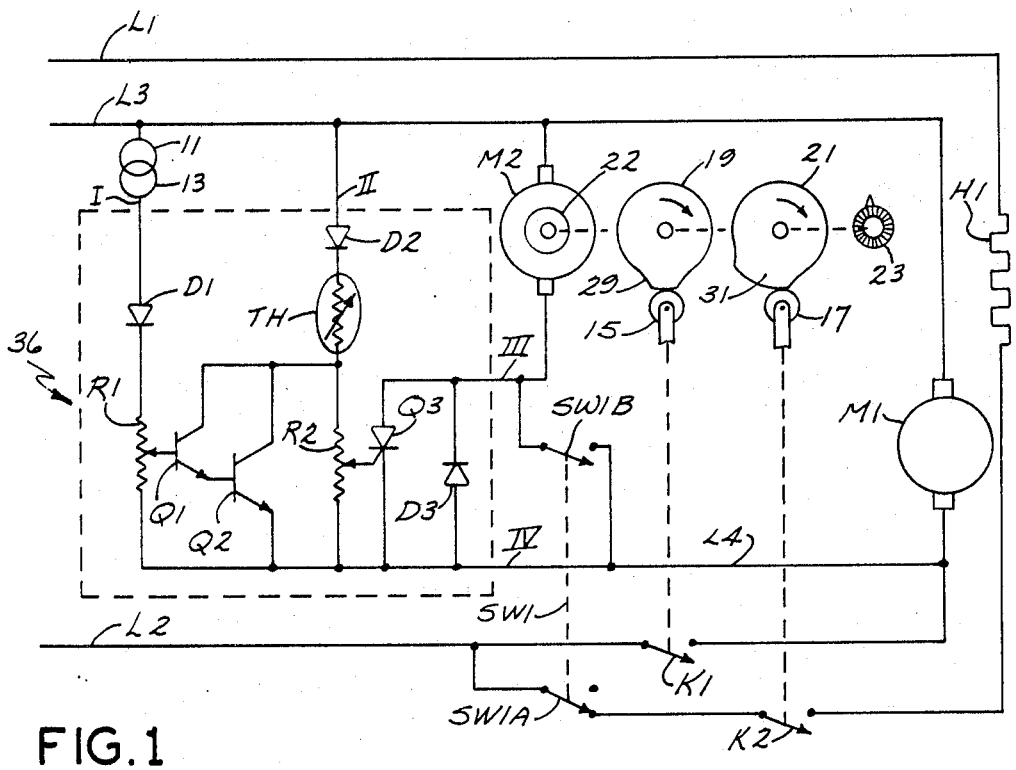

This invention relates to a dryer control and more particularly to such a control which senses the moisture content of a load to be dried by means of the resistance of a current path through the load.

Electronic dryness sensing controls for home clothes dryers of the type described above have been manufactured heretofore. However, such controls have typically required the inclusion of a capacitor of relatively large value to filter or integrate the signal obtained from the sensing path to prevent the drying cycle from being terminated prematurely by transient variations in the resistance of the path. The capacitors employed represented a substantial portion of the cost of the control because the extremely high values of resistance encountered require that very low leakage capacitors and high impedance sensors be used, and care was required to maintain high impedance circuitry.

Furthermore, such prior art controls usually provided an essentially immediate termination of the drying cycle when a predetermined dryness level was reached. This then required that the dryness control be responsive to changes in resistance at the extremely high values of resistance which correspond to the almost complete elimination of moisture from the load.

Among the several objects of the present invention may be noted the provision of a control for a dryer which will terminate a drying cycle after a predetermined level of dryness is attained; the provision of such a control which employs the resistance of a current path through a load to be dryed as an indication of the dryness of the load; the provision of such a control which will not prematurely terminate a drying cycle due to transient variations in the resistance of the sensing path; the provision of such a control which does not require the use of expensive capacitors; the provision of such a control in which the sensing of extremely high resistance levels is not required; the provision of such a control which is highly reliable and which is relatively simple and inexpensive. Other objects and features will be in part apparent and in part pointed out hereinafter.

Briefly, a control according to this invention is operative with a dryer having means for agitating a load to be dried and electrode means for contacting the load to establish a current path therethrough, the resistance of the path being variable as a function of the moisture content of the load. The control includes heater means having a predetermined thermal inertia and means for energizing the heater as a function of the resistance of the current path. The control also incorporates means for terminating a cycle of operation of the dryer and means for operating the terminating means when the temperature of the heater passes a preselected threshold. Accordingly, a drying cycle is terminated after a predetermined level of dryness is attained and the thermal inertia of the heater means prevents operation of the terminating means by transient variations in the resistance of the current path.

The invention accordingly comprises the constructions hereinafter described, the scope of the invention being indicated in the following claims.

Figure 2:
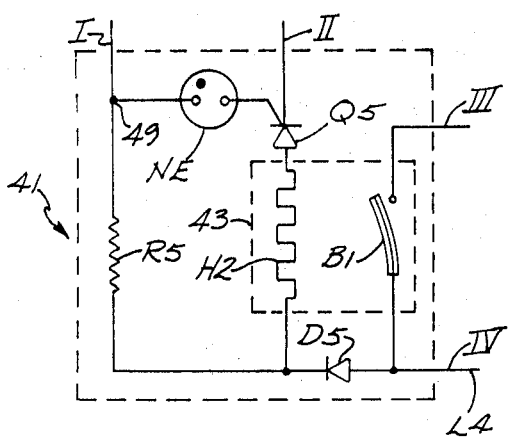

In the accompanying drawings in which several of various possible embodiments of the invention are illustrated, FIG. 1 is a schematic circiut diagram of a dryer employing a control according to the present invention; and FIG. 2 is a schematic circuit diagram of another embodiment of the control of this invention.

Corresponding reference characters indicate corresponding parts throughout the several views of the drawings.

Referring now to FIG 1, A.C. power for energizing the dryer is provided through three supply leads L1, L2 and L3. Preferably leads L1 and L2 are of opposite phase with respect to lead L3 which is a neutral or ground lead in convention manner. Leads L1 and L2 may, for example, each provide 110 v. A.C. with respect to lead L3, there being 220 v. A.C. between leads L1 and L2. The physical construction of the dryer may be conventional and is therefore not illustrated in detail herein. The dryer includes a motor as indicated at M1 for agitating the load to be dried, as by rotating a drum within which the load is contained, and for driving a blower which ventilates the load to carry off moisture evaporated therefrom. A heater H1 is provided to heat the load or the air which is being blown through the load thereby to accelerate the evaporation of moisture. The dryer further includes a pair of electrodes, indicated diagrammatically at 11 and 13, which are adapted to contact a load being dried thereby to establish a current path therethrough, the resistance of the path being variable as a function of the moisture content of the load. Various suitable dryer drum and electrode constructions are shown in Patent 3,266,167 issued Aug. 16, 1966 to F. Finnegan.

Motor M1 is selectively energized from leads L2 and L3 through a circuit which includes a set of timer contacts K1. A supply lead L4 is connected between motor M1 and contacts K1 so as to be energized simultaneously with the motor. Heater H1 is selectively energized from leads L1 and L2 through a circuit which includes a set of timer contacts K2 and one section (SW1A) of a double pole switch SW1. Contacts K1 and K2 are operated by respective cam followers 15 and 17 which bear against and are controlled by respective cams 19 and 21. Cams 19 and 21 are coupled to and driven by a geared-down timer or clock motor M2 through an over-ride or slip clutch as indicated at 22. A knob 23 is mounted on the shaft with cams 19 and 21 so that the cams 19 and 21 may be manually rotated by means of the knob 23 independently of rotation of the motor M2.

The cams 19 and 21 include respective lobes 29 and 31 so that, when the cams are in the positions shown in FIG. 1, the respective contacts K1 and K2 are operated to their open positions. The timer thus constitutes a means for terminating a cycle of operation of the dryer.

The electrode 11, which may for example comprise the dryer drum itself, is grounded to lead L3 while the other electrode 13 is connected to lead L4 through a diode D1 and a potentiometer R1 which comprise parts of a dryness responsive circuit indicated generally at 36. The movable tap of potentiometer R1 is connected to the base or input circuit of one (Q1) of a pair of NPN transistors Q1 and Q2. Transistors Q1 and Q2 are interconnected in a Darlington amplifier configuration to provide a high input impedance, their collectors being connected together and the emitter of transistor Q1 being connected to the base of transistor Q2. The emitter of transistor Q2 is connected to lead L4 and the common connection to the collectors of the two transistors, which comprises the output circuit of the amplifier, is connected to lead L3 through a thermistor TH and a diode D2.

Thermistor TH is of the PTC type, that is, it has a positive temperature coefficient of resistivity. Further, thermistor TH is preferably constructed of a material having a transistor temperature above which the resistivity of the material rises relatively abruptly. Such materials are known in the art for use as self-regulating heating means since the abruptly increasing resistance characteristic can be employed to reduce the device's dissipation thereby to maintain its temperature at the transition level. The junction between the transistor collectors and thermistor TH is connected to lead L4 through a potentiometer R2 and the movable tap of the potentiometer is connected to the gate of an SCR (silicon controlled rectifier) Q3. The cathode of SCR Q3 is connected to lead L4 and its anode is connected to one side of the timer motor M2. The other side of the timer motor is connected to lead L3. The anode-cathode circuit of SCR Q3 is shunted by a diode D3 which is oriented so as to conduct in the direction opposite that in which conduction is permitted through SCR Q3 and both of these elements are in turn shunted by the other section (SW1B) of switch SW1.

The operation of the control of FIG. 1 is substantially as follows, it being assumed initially that the switch SW1 is in the position shown. To initiate a normal drying cycle, the cams 19 and 21 are rotated, by means of knob 23, in the clockwise direction so that the contacts K1 and K2 are allowed to close. The motor M1 and the heater H1 are thereby energized and will thus begin to dry a load placed in the dryer. Assuming that the load is relatively damp at the start of the cycle, the typical resistance presented across electrodes 11 and 13 will be relatively low. Thus, during those A.C. half cycles when the lead L2 is negative with respect to the neutral lead L3, the Darlington amplifier comprising transistors Q1 and Q2 will be forward biased by current flowing through diode D1 and the potentiometer R1. Transistors Q1 and Q2 will therefore conduct and energize thermistor TH as a function of the resistance of the sensing path. The energization of thermistor TH causes it to self-heat to its transition temperature at which point its increasing resistance reduces the power consumed to a level substantially equal to the power which can be dissipated by the thermistor in its particular environment.

When transistors Q1 and Q2 are conducting, only a relatively small voltage appears across the collector-emitter circuit of transistor Q2 and the portion of this voltage chosen by the setting of potentiometer R2 is insufficient to trigger the SCR Q3. Accordingly, no current will flow through the timer motor M2 on those A.C. half cycles when lead L2 is negative with respect to lead L3. On the alternate half cycles, current passed by diode D3 will pass through the motor, but as the motor M2 is of an A.C. type, this pulsating D.C. does not cause the motor to run or to advance the cams 19 and 21. Thus, as long as the load being dried presents a relatively low resistance between the electrodes 11 and 13, the dryer motor M1 and heater H1 will continue to be energized and the timer will not advance. While this unbalanced or direct current component applied to the motor M2 causes some slight heating, it has been found that this slight heating has no apparent deleterious effect on a variety of conventional timer motors.

As the load dries, the resistance presented between electrodes 11 and 13 increases in known manner and the voltage across potentiometer R1 will therefore drop. When the voltage at the movable tap of potentiometer R1 falls to a level which is insufficient to forward bias the Darlington amplifier, transistors Q1 and Q2 will cease drawing current through thermistor TH and will stop shunting potentiometer R2. Potentiometer R2 is adjusted so that, while thermistor TH remains hot and in a high resistance state, there will be insufficient voltage provided at the tap of the potentiometer to trigger SCR Q3 even though the transistors Q1 and Q2 are cut off. Thus, any response of the SCR Q3 to a change in the resistance between electrodes 11 and 13 is delayed by the thermal inertia of the thermistor TH. The thermal and electrical characteristics of thermistor TH are chosen so that the response time of the control to increases in the resistance between electrodes 11 and 13 is on the order of a few seconds. Accordingly, transitory increases in the sensed resistance, e.g., as might be caused by a momentary separation of all items in a load from one of the electrodes or by the encountering of an exceptional dry item in the load, do not allow the thermistor to cool down and thus do not cause the SCR Q3 to be fired.

On the other hand, when the average or typical resistance between electrodes 11 and 13 increases, thereby indicating that the load being dried is really getting drier, the transistors Q1 and Q2 will be turned off for periods which are long enough to allow the thermistor TH to cool down from its transition temperature. An advantage of using a PTC thermistor with self-regulating properties is that the temperature level from which the thermistor must cool does not vary with the size of the load being dried. When transistor TH cools down below a predetermined threshold and the transistors Q1 and Q2 are not conducting, the voltage applied to the gate of SCR Q3 by the movable tap of potentiometer R2 becomes sufficient to trigger the SCR into conduction. The SCR thus responds to changes in the resistance of thermistor TH. When SCR Q3 conducts, current is applied to motor M2 on both A.C. half cycles and thus the timer motor will run. The SCR Q5 thus consistitutes a means for selectively operating the timer. The temperature of thermistor TH may also be sensed by a bimetal switch which then controls the timer motor. Motor M2 runs until the lobes on cams 19 and 21 are brought into engagement with the respective cam followers 15 and 17 to open the contacts K1 and K2 thereby deenergizing the dryer. The duration of the timed portion of the drying cycle can be preselected by manually positioning the cams relative to the position in which the dryer is deenergized. The cam lobe 31 which operates contacts K2 is preferably longer than the lobe 29 which controls the dryer and timer motors so that the heater H1 is turned off before the dryer motor is deenergized. In this way a cool-down period is provided in which the load is agitated and ventilated without being heated.

From the foregoing explanation it can be seen that the control causes the dryer to be operated for a timed interval after a predetermined level of dryness is reached. Since a preselectable timed period is provided after the dryness sensing period, the sensing circuit does not have to discriminate between very high levels of resistance such as are encountered at the end of a drying cycle in which a load is to be completely dried. Rather, the selection of the particular level of dryness which is to be attained can be performed by varying the duration of the timed portion of the cycle. The dryness sensing circuitry can then be set, by means of the potentiometer R1, to energize the timer M2 when a relatively damp level of dryness has been obtained. This level of dryness may, for example, correspond to a resistance between electrodes 11 and 13 on the order of two or three megohms whereas a resistance on the order of 50 to 100 megohms would have to be detected if a completely dry condition were to be sensed. If desired, substantial portions of the circuit 36 may be constructed in hybrid or integrated circuit form.

If it is desired to provide a so-called fluff-dry cycle in which the load is agitated and ventilated without being heated, the switch SW1 is thrown to its opposite position so that the heater H1 is deenergized and the timer motor M2 is energized independently of the dryness sensing circuit 36. The dryer motor M1 is then energized for a period determined only by the setting of the timer cams. Instead of employing a separate switch such as SW1, the fluff-dry cycle may, as an alternative, be provided by employing timer cams which include separate sections or portions for the normal drying and fluff-drying modes of operation respectively, the heater H1 being deenergized during the fluff-dry cycle, and by providing a holding circuit for the timer motor M2.

In FIG. 2 there is illustrated a dryness responsive circuit 41 which may be substituted for the circuit 36 in FIG. 1, corresponding connections to the remainder of the circuit being indicated by corresponding Roman numerals in FIGS. 1 and 2. The dryness responsive circuit 41 includes a thermal relay 43 for selectively energizing the timer motor M2. Relay 43 includes a resistance heater H2 which has a predetermined thermal inertia and therefore requires a predictable period of energization to reach a given temperature. Relay 43 also includes a temperature-responsive bimetal switch B1 which is in heat exchange relationship with heater H2, the switch being closed when the temperature of the heater reaches a predetermined level or threshold. A PTC thermistor operated in a self-heated mode may be used in place of heater H2. The switch B1 is connected to selectively energize the timer motor M2 from lead L4. The remainder of the circuit 41 is energized only on those A.C. half cycles during which the lead L2 is positive with respect to the neutral lead L3, power being supplied thereto through a diode D5. This is to be contrasted with the operation of the dryness responsive portion of the circuit 36 of FIG. 1 which operates during the opposite or negative half cycles. One side of heater H2 is connected to the diode D5 and the other side is connected, through the anode-cathode circuit of an SCR Q5, to the neutral lead L3. Heater H2 is thus energized with half-wave rectified power when SCR Q5 is triggered.

The dryness sensing electrode 13 is connected, through a resistor R5, to diode D5 so that the sensing resistance and resistor R5 comprise a voltage divider which is energized by half-wave rectified current. A junction 49 between electrode 13 and resistor R5 is connected, through a neon glow tube NE, to the gate of SCR Q5. As is understood by those skilled in the art, the neon glow tube NE will break down and conduct when the voltage across it exceeds a predetermined threshold. The tube NE thus constitutes a voltage sensitive breakdown device for triggering SCR Q5 when the voltage at junction 49 relative to lead L3 exceeds a predetermined value.

The operation of this circuit is substantially as follows. The heater H2 is energized by SCR Q5 as a function of the resistance of the dryness sensing path, that is, when the load being dried is relatively damp, the typical voltage at junction 49 is relatively low since the typical resistance presented between electrodes 11 and 13 is relatively low. Thus, the neon tube NE will not fire, the SCR Q5 will not be triggered and the heater H2 will not be energized. Accordingly, the bimetal switch B1 remains open and the timer does not run. If, during agitation, the load being dried should momentarily bounce out of contact with one of the electrodes 11 or 13, the tube NE and the SCR Q5 will fire briefly, thereby passing current to the heater H2. However, the thermal inertia of the heater H2 will prevent such brief periods of energization from increasing its temperature to a level high enough to close the bimetal switch B1.

As the moisture content of the load being dried is reduced by the action of the dryer, the average or typical resistance presented between the electrodes 11 and 13 increases and thus the neon tube NE will conduct for substantial portions of the time. Accordingly, the heater H2 will be substantially energized by SCR Q5 and its temperature will gradually rise to a level or threshold sufficient to close the bimetal switch B1 thereby starting the timer motor. Once the timer motor is started the cycle proceeds as described previously with reference to FIG. 1. As in that previous embodiment, the level of dryness to be attained is selected by adjusting the length of the timed portion of the cycle and thus the dryness signal responsive circuit 41 can be adjusted, by the choice of the value of resistor R5, to operate at a relatively low value of sensed resistance.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for a dryer having means for agitating a load to be dried and electrode means for contacting the load to establish a current path therethrough, the resistance of said path being variable as a function of the moisture content of the load, said control comprising:
   heater means having a predetermined thermal inertia;
   means for energizing said heater as a function of the resistance of said path;
   means for terminating a cycle of operation of said dryer; and
   means for operating said terminating means when the temperature of said heater passes a preselected threshold whereby a drying cycle is terminated after a predetermined level of dryness is attained and the thermal inertia of said heater means prevents operation of said terminating means by transient variations in the resistance of said path.

2. A control for a dryer as set forth in claim 1 wherein said heater means comprises a thermistor, and wherein said means for operating said terminating means includes means responsive to the resistance of said thermistor.

3. A control for a dryer as set forth in claim 2 wherein said means for energizing said heater includes a transistor amplifier having an input circuit which is connected to said electrode means and an output circuit which is connected to said thermistor thereby to heat said thermistor to an extent which varies as a function of the resistance of said path.

4. A control for a dryer as set forth in claim 3 wherein said amplifier comprises a pair of transistors interconnected in a Darlington amplifier configuration thereby to provide a high input impendance.

5. A control for a dryer as set forth in claim 2 wherein said means responsive to the resistance of said thermistor includes the gate circuit of an SCR.

6. A control for a dryer as set forth in claim 2 wherein said thermistor has a positive temperature coefficient of resistivity.

7. A control for a dryer as set forth in claim 6 wherein said means responsive to the resistance of said thermistor includes the gate circuit of an SCR which is forward biased through said thermistor whereby said SCR is triggered into conduction when the temperature of said thermistor is below said preselected threshold.

8. A control for a dryer as set forth in claim 7 wherein said terminating means comprises a timer which is driven by an A.C. motor and wherein said timer is connected across an A.C. source through a circuit which includes a diode and said SCR connected in parallel, said diode and said SCR being oriented for conduction in opposite directions whereby A.C. is applied to said motor when said SCR is triggered into conduction.

9. A control for a dryer as set forth in claim 2 wherein said thermistor comprises a semiconductor material having a transition temperature above which the resistance of said material rises relatively abruptly.

10. A control for a dryer as set forth in claim 1 wherein said heater means comprises an electric resistance heater and said means for operating said terminating means includes a bimetal switch in heat exchange relationship with said resistance heater.

11. A control for a dryer as set forth in claim 10 wherein said bimetal switch closes to energize said terminating means when the temperature of said heater exceeds said preselected threshold.

12. A control for a dryer as set forth in claim 10 wherein said means for energizing said heater includes an SCR the anode-cathode circuit of which is connected in series with said resistance heater.

13. A control for a dryer as set forth in claim 12 wherein said means for energizing said heater includes a voltage sensitive breakdown device for triggering said SCR into conduction when the resistance of said path passes a predetermined threshold.

14. A control for a dryer as set forth in claim 13 wherein said voltage sensitive breakdown device is a neon glow tube.

15. A control for a dryer as set forth in claim 1 wherein said terminating means comprises timer means for terminating a cycle of operation of said dryer a preselectable time after the temperature of said heater means passes said preselected threshold.

16. A control for a dryer as set forth in claim 15 wherein said dryer includes a drying heater for accelerating drying of said load and wherein said timer comprises:
respective switches for selectively energizing said drying heater and said agitating means;
respective cams for operating said switches in predetermined sequence; and
motor means actuated by said operating means for driving said cams at a predetermined speed to open said switches after said preselectable time thereby to terminate said drying cycle.

17. A control for a drying having means for agitating a load to be dried and electrode means for contacting the load to establish a current path therethrough, the resistance of said being variable as a function of the moisture content of the load, said control comprising:
a thermistor having a predetermined thermal inertia;
amplifier means interconnected with said electrode means for passing a heating current through said thermistor, which current varies as a function of the resistance of said path;
timer means for terminating a cycle of operation of said dryer a preselectable time after said timer means is energized; and
means responsive to the resistance of said thermistor for energizing said timer means when said load reaches a predetermined level of dryness.

18. A control for a dryer having means for agitating a load to be dried and electrode means for contacting the load to establish a current path therethrough, the resistance of said path being variable as a function of the moisture content of the load, said control comprising:
a resistance heater;
means interconnected with said electrode means for energizing said heater when the resistance of said path exceeds a predetermined level;
timer means for terminating a cycle of operation of said dryer a preselectable time after said timer means is energized; and
temperature responsive switch means in heat exchange relationship with said heater for energizing said timer means when said load reaches a predetermined level of dryness.

References Cited

UNITED STATES PATENTS

| | | | |
|---|---|---|---|
| 3,116,982 | 1/1964 | McIlvane | 34—45 |
| 3,271,877 | 9/1966 | Guenther et al. | 34—45 |
| 3,302,299 | 2/1967 | Scherzinger | 34—45 |
| 3,394,466 | 7/1968 | Heidtmann | 34—45 |
| 3,402,478 | 9/1968 | Hetrick | 34—53 |

EDWARD G. FAVORS, Primary Examiner

U.S. Cl. X.R.

34—53